US012111511B2

(12) United States Patent
Paranto et al.

(10) Patent No.: US 12,111,511 B2
(45) Date of Patent: Oct. 8, 2024

(54) ATHERMAL OPTICAL FRAMEWORKS

(71) Applicant: Applied Research Associates, Inc., Albuquerque, NM (US)

(72) Inventors: Joseph N. Paranto, Albuquerque, NM (US); Michael E. Meline, Albuquerque, NM (US); Devin M. J. Todd, Orlando, FL (US); Matthew Flint Kepler, Austin, TX (US); Martin William Slack, Edgewood, NM (US)

(73) Assignee: Applied Research Associates, Inc., Albuquerque, NM (US)

( * ) Notice: Subject to any disclaimer, the term of this patent is extended or adjusted under 35 U.S.C. 154(b) by 730 days.

(21) Appl. No.: 17/325,982

(22) Filed: May 20, 2021

(65) Prior Publication Data
US 2022/0373763 A1 Nov. 24, 2022

(51) Int. Cl.
*G02B 7/02* (2021.01)
*G02B 7/00* (2021.01)
*H04N 23/55* (2023.01)

(52) U.S. Cl.
CPC ............ *G02B 7/028* (2013.01); *G02B 7/021* (2013.01); *H04N 23/55* (2023.01); *G02B 7/008* (2013.01)

(58) Field of Classification Search
CPC .......... G02B 7/028; G02B 7/02; G02B 7/008; G02B 7/026; H04N 23/55; H04N 23/52
See application file for complete search history.

(56) References Cited

U.S. PATENT DOCUMENTS

| | | | |
|---|---|---|---|
| 6,741,408 B2 * | 5/2004 | Beattie | H04J 14/02 385/37 |
| 2002/0063864 A1 * | 5/2002 | Honig | G02B 7/008 356/326 |
| 2004/0051965 A1 | 3/2004 | Weber et al. | |

(Continued)

FOREIGN PATENT DOCUMENTS

| | | |
|---|---|---|
| JP | 5589925 B2 | 7/1980 |
| JP | 08007313 | 1/1996 |

(Continued)

OTHER PUBLICATIONS

PCT Patent Application PCT/US2022/029812 Written Opinion of the International Searching Authority issued Mar. 15, 2023.

(Continued)

*Primary Examiner* — George G. King
*Assistant Examiner* — Anna Smith
(74) *Attorney, Agent, or Firm* — Erise IP, P.A.

(57) ABSTRACT

Configurations and compositions for frameworks supporting optics such as lenses are described that provide an invariant structure regardless of temperature swings, thereby maintaining alignment and focus. Frameworks may comprise tiered structures of materials having multiple distinct coefficients of thermal expansion. An optical framework includes a first framework portion coupled to a first lens and a second framework portion coupled to a second lens. The first framework portion and second framework portion comprise materials having a coefficient of thermal expansion such that expansion of the first framework portion in one direction is offset by expansion of the second framework portion in an opposite direction.

20 Claims, 6 Drawing Sheets

(56) References Cited

U.S. PATENT DOCUMENTS

| | | | | |
|---|---|---|---|---|
| 2011/0075279 A1* | 3/2011 | Reichmann | ............ | G02B 7/008 |
| | | | | 359/820 |
| 2013/0126717 A1* | 5/2013 | Donce | ....................... | G02B 7/02 |
| | | | | 359/827 |
| 2013/0208367 A1* | 8/2013 | Thomas | ................. | G02B 7/008 |
| | | | | 359/732 |
| 2016/0018619 A1* | 1/2016 | Gustafson | .............. | G02B 7/026 |
| | | | | 29/525.08 |
| 2016/0295081 A1* | 10/2016 | Graff | ...................... | G02B 7/028 |

FOREIGN PATENT DOCUMENTS

| | | |
|---|---|---|
| JP | 08220409 | 8/1996 |
| JP | 2001272587 A | 10/2001 |

OTHER PUBLICATIONS

PCT Patent Application PCT/US2022/029812 International Search Report, issued Mar. 15, 2023.

* cited by examiner

ATHERMAL OPTICAL FRAMEWORKS

STATEMENT OF GOVERNMENTAL SUPPORT

This invention was made with government support under ONR Contract #N00014-17-C-7022 awarded by the United States Office of Naval Research. The government has certain rights in the invention.

BACKGROUND

1. Field

Embodiments of the invention are broadly directed to optical frameworks that minimize the deleterious effect of thermal expansion and contraction on aligned lenses or other optical elements. Specifically, embodiments of the invention employ a plurality of materials of varying lengths and thermal expansion coefficients that result in a net-zero displacement despite undergoing a change in temperature. Embodiments may be configured to provide athermal optics for a weaponized laser generation system, such as that described by U.S. Pat. No. 10,900,755, the description of which is herein incorporated by reference in its entirety.

2. Related Art

Optical elements need to be carefully aligned via a supporting optical framework to accurately focus incoming or outgoing light to a desired target. Examples include a telescope, which focuses incoming light, and laser optical outputs, which focus an outgoing beam of light. The distance between lenses of a telescope must be calibrated such that captured light is focused on a target. Targets of simple telescopes may be the retina of the human eye. More sophisticated telescopes may target a light-sensitive image capture device, such as a CCD. If the careful alignment of the lenses is lost, the image is blurred, and the telescope may be damaged. Similarly, laser optics refocus an outgoing beam of lased light. The high-energy laser is spread to an appropriate beam width and directed at a desired target. If alignment of the lenses is lost, the intensity of the beam suffers and, in the case of a weaponized laser, it may no longer function at a high enough power level to produce the desired effect.

A particular source of alignment loss often encountered is expansion or contraction of the materials used to support and align the lenses due to a change in ambient temperature. Returning to our previous examples, telescopes that are aligned on earth and then transported to the cold of space experience significant thermal contraction, while laser optics aligned at room temperature experience significant thermal expansion while in use due to heating from the laser. Accordingly, there is a need for optical frameworks that negate the deleterious effects of thermal expansion and contraction, preserving alignment between optical elements despite ambient temperature swings.

SUMMARY

Embodiments of the invention address this need by providing frameworks for supporting and/or aligning optical elements via configurations and materials that negate expansion and contraction experienced due to a change in temperature. Embodiments of the invention may be formed of a plurality of distinct portions composed, completely or primarily, of distinct materials having distinct coefficients of thermal expansion. Framework portions may, in some embodiments, be tiered such that the framework portion "steps down" in a wedding cake-like structure from a large circumference to a smaller circumference. Specifically, in some embodiments, a longer framework portion may have a smaller coefficient of thermal expansion than a shorter framework portion.

In a first embodiment, an optical assembly comprises a framework having a first framework portion coupled to a first lens and a second framework portion coupled to a second lens. The first and second framework portions are formed of distinct materials such that thermal expansion of the first framework portion is equal and opposite to thermal expansion of the second framework portion. The first framework portion may be formed of a plurality of tiers, with the largest tier being coupled to the first lens and the smallest tier being the closest tier to the second portion. In some embodiments, the second lens is surrounded in two dimensions by at least a part of the first framework portion.

In a second embodiment, an optical assembly comprises a framework aligning a first lens with a second lens. The second portion is formed of a material having a greater coefficient of thermal expansion than that of the material forming the first portion, and the length of the first portion is greater than that of the second portion. As a result, thermal expansion of the first portion is equal and opposite to the thermal expansion of the second portion. The first framework may be formed of three rods, though in some embodiments any number of rods may be used. The rods of one tier may align with those of adjacent tiers, or may intentionally not align with the rods of other tiers in order to increase strength.

In a third embodiment, a lens alignment system comprises a longer first portion having a first coefficient of thermal expansion and shorter second portion having a second coefficient of thermal expansion greater than the first coefficient of thermal expansion. The framework aligns the lenses at a particular spaced apart distance. The first portion and said second portion are arranged such that the distance between the lenses remains constant throughout an operating temperature range of the system. The first portion may be formed of a plurality of tiers, which may each have a unique circumference.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

Embodiments of the invention are directed to systems for supporting and aligning optical elements, such as lenses, in a manner that reduces the effect of thermal expansion and contraction. Embodiments of the invention first address these issues by providing portions of distinct lengths and coefficients of thermal expansion, wherein thermal expansion of one portion is offset by the thermal expansion of another portion in the opposite direction. Specifically, the ratio of the length of the first framework portion to the length of the second framework portion may be inversely proportional to a ratio of the coefficient of thermal expansion of the first framework portion to the coefficient of thermal expansion of the second framework portion. Embodiments may further include configurations for improving overall strength of the framework, such tiering and particular coupling arrangements. Specifically, one or more rings may have one or more bolt holes drilled through for coupling the tiers of the first framework portion together. This description is intended as an example of embodiments of the invention and is not intended to be limiting.

The subject matter of embodiments of the invention is described in detail below to meet statutory requirements; however, the description itself is not intended to limit the scope of claims. Rather, the claimed subject matter might be embodied in other ways to include different elements, structures, steps, or combinations of steps similar to the ones described in this document, in conjunction with other present or future technologies. Minor variations from the description below are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Embodiments of the Invention

Figure 1:
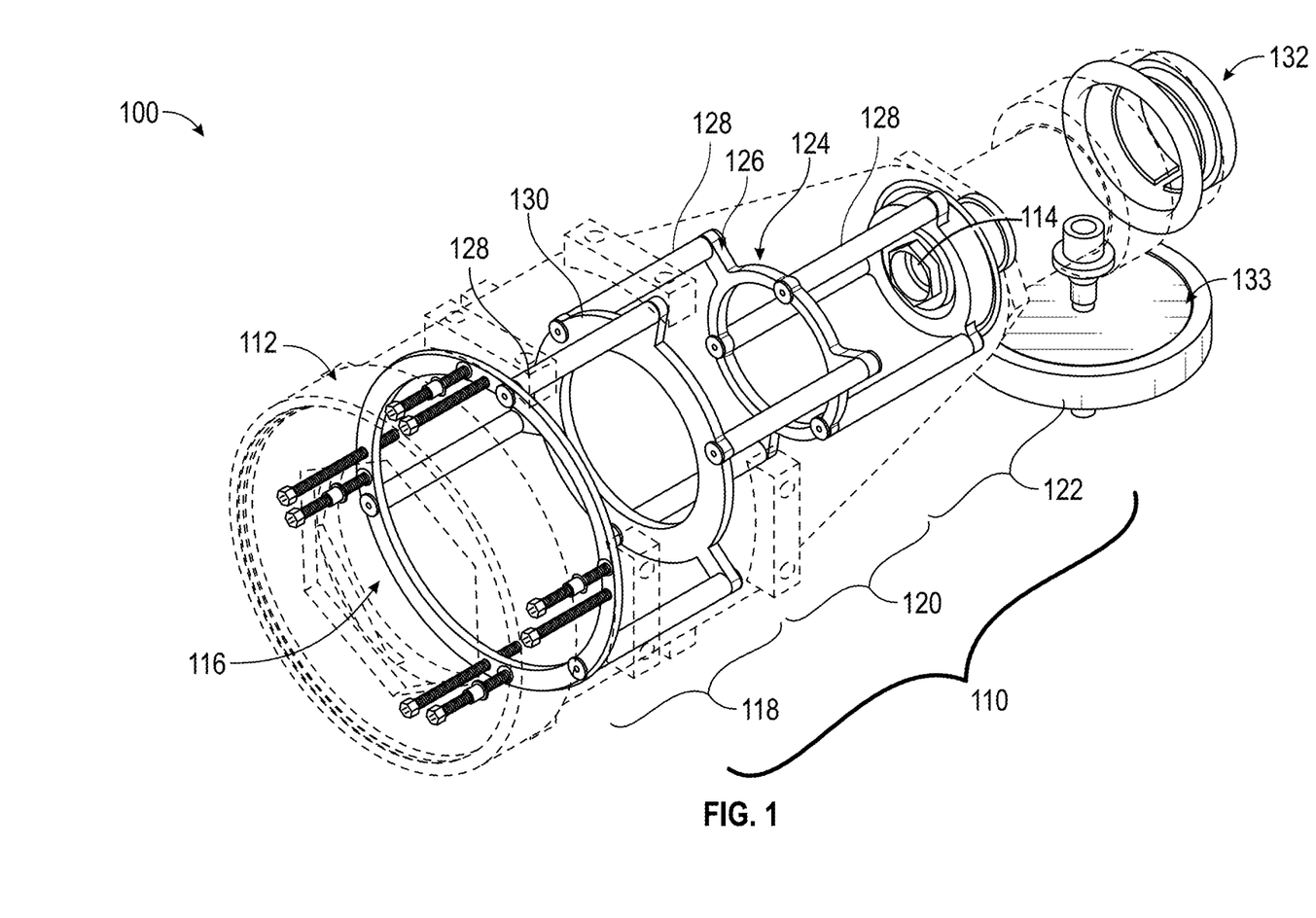
FIG. 1 depicts an exemplary hardware structure for a first embodiment of the invention.

Turning first to FIG. 1, an exemplary optical framework 100 comprises a first framework portion 110 coupled to a first lens 114 and a second framework portion 112 coupled to a second lens 116. The optical framework 100 may additionally or alternatively support any number of optical elements, such as lenses, mirrors, windows, and/or beam splitters, affixing them and maintaining a calibrated alignment. In some embodiments, optical framework may include three lenses, four lenses, or any number thereof. The first and second framework portions 110, 112 may, in some embodiments, be coupled directly to one another or may be coupled to one or more intermediary framework portions (not shown). In the embodiment illustrated in FIG. 1, the first framework portion 110 comprises a plurality of tiers, each having a distinct circumference. The first framework portion 110 in combination with rings coupling each tier would resemble a wedding cake if stood on end such that the largest tier is at the bottom. FIG. 1 illustrates framework portion 110 having an exemplary three tiers: 118, 120, and 122. An exemplary rod providing a portion of the structure of a tier is labeled 128, which in this case is illustrated as being in the second tier 120. Any tier of embodiments may comprise any number of rods 128 of any appropriate length, material, or spacing.

In the particular embodiment illustrated in FIG. 1, first tier 122 comprises three rods 128 connected to a first ring 124, second tier 120 comprises three rods 128 between ring 124 and ring 130, and third tier 118 comprises three rods 128 connected to ring 130 and a second framework portion 112. In some embodiments, the rods 128 are offset between tiers 118, 120, 122 such that rods of any particular tier do not align with rods of adjacent tiers at a ring to which each adjacent tier is coupled. In embodiments, each tier may have a distinct circumference, while in other embodiments at least two tiers may have equal circumferences.

In some embodiments, the first framework portion 110 may have any number of tiers, or may not be configured in a tiered formation at all. For instance, in some embodiments, the framework may smoothly taper in a conical shape. In other embodiments, the framework may have an exterior cylindrical shell with an inset framework portion. In some embodiments, air filter 133 may be included to allow air pressure equalization within the optical assembly when fiber connector 134 or other receiver is inserted therein.

Specific embodiments may have precisely three tiers or four tiers, or any number of desired tiers. In some embodiments, the largest circumference tier 118 of the first framework portion 110 may be coupled to or nearest to the second framework portion 112. In some embodiments, the smallest circumference tier 122 of the first framework portion 110 may be coupled to or nearest to the first lens 114. In some embodiments, tiers of the first framework portion 110 may be concentric. In other embodiments, the tiers of the first framework portion 110 may be non-concentric. In some embodiments, the relative length of each tier may be the same as the relative circumferences, such that the tier with the largest circumference has the longest length and the tier with the smallest circumference has the shortest length. Alternatively, the relative length of each tier may be inversely proportional to the relative circumferences, such that the tier with the largest circumference is the shortest and the tier with the smallest circumference is the longest. These are intended only as examples. Tiers may be of any combination of lengths and circumferences in some embodiments of the invention.

In some embodiments, consecutive tiers of a portion of the optical framework may be coupled by rings, such as ring 124. As will be discussed in further detail below, rings 124 may be formed of a third material. The third material of one or more rings 124 may be distinct from the first material comprising the first framework portion 110 and distinct from the second material comprising the second framework portion 112. Specifically, the third material of the rings 124 may have a coefficient of thermal expansion that is distinct from the first framework portion 110 material's coefficient of thermal expansion and the second framework portion 112 material's coefficient of thermal expansion. In some embodiments, the third coefficient of thermal expansion may be greater than the first coefficient of thermal expansion and/or less than the second coefficient of thermal expansion.

Figure 2A:
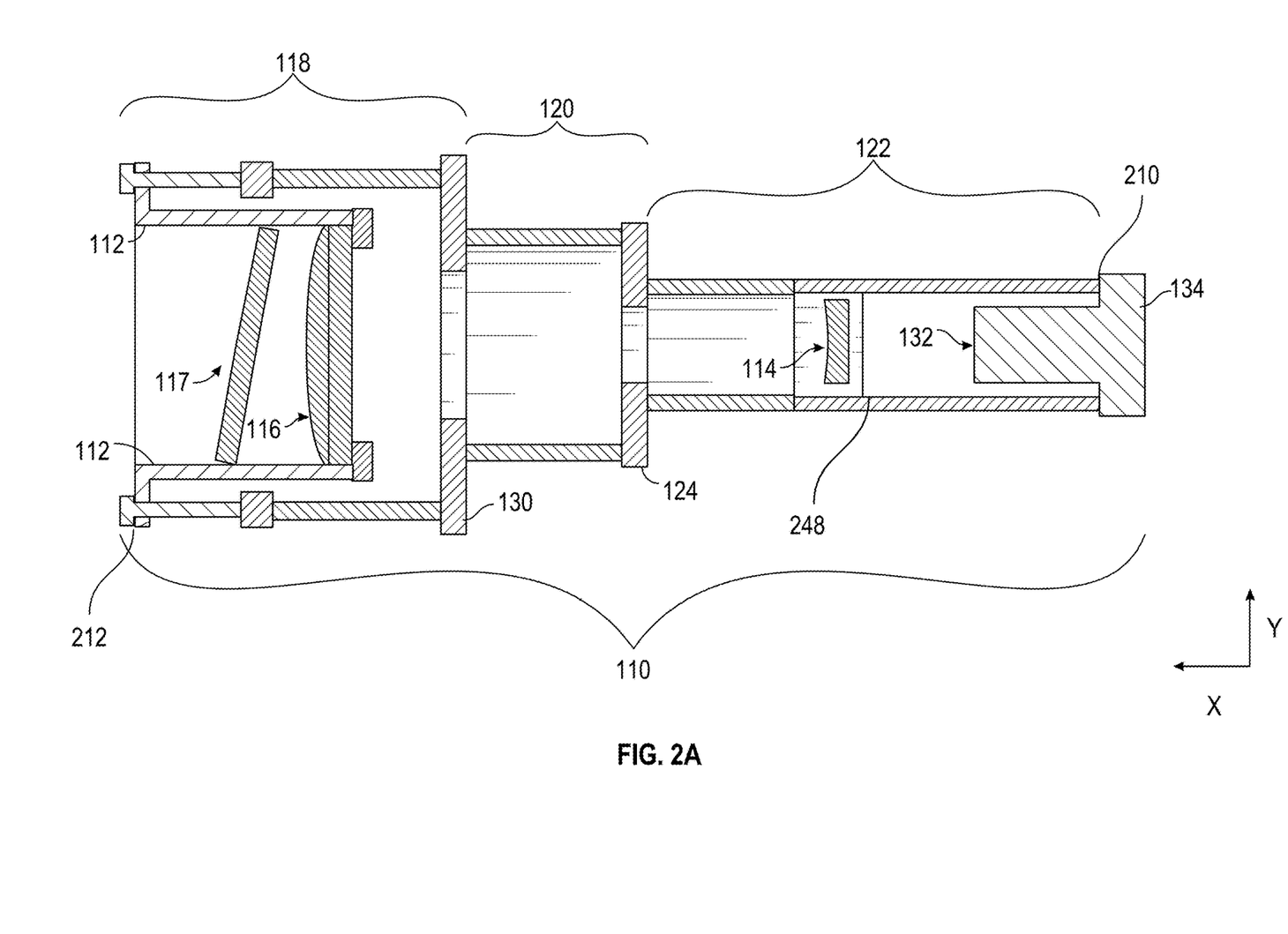
FIG. 2A depicts a cross-sectional diagram of an embodiment of the invention.

FIG. 2A presents a cross-sectional diagram of the embodiment of an athermal optical framework of FIG. 1. Dimensions of particular elements have been exaggerated for clarity of description. A first portion of the optical framework 110 is formed of three tiers 118, 120, and 122 adjoined by a first ring 124 and a second ring 130. In some embodiments, rings 124 and 130 may be identical or may have distinct circumferences and/or widths. The set of all rings in an embodiment may be referred to as a third framework portion. In the embodiment illustrated in FIG. 2A, the total length of the first framework portion 110 extends from a point 210 at which it terminates at a connection with a fiber connector 134 to a point 212 at which it is coupled to second framework portion 112. Embodiments may have more or fewer tiers, or none at all. Second framework portion 112 is illustrated as much longer in FIG. 2A than in FIG. 1 for illustration purposes. In some embodiments, the first framework portion 110 and second framework portion 112 may be of any given length, though advantageously the lengths of the first and second framework portion 110, 112 may be selected to have a particular mathematical relationship relative to their corresponding coefficients of thermal expansion. This will be discussed in further detail below.

As can be seen in FIG. 2A, first framework portion 110 may couple to first lens 114 while second framework portion 112 may couple to second lens 116. Lenses 114, 116 may be coupled to framework portions 110, 112 by one or more O-rings, additional intermediary framework structures, and/or epoxy, or other mechanical means. Fiber connector 134, in some embodiments, may be a titanium coupling to a laser beam generator, terminating at a laser emitting fiber tip 132. A generated laser may be emitted from tip 132, which is then refocused by lenses 114 and 116 before being directed towards a target through output window 117. In embodiments in which the optical assembly is used for a telescope or other light collector, fiber tip 132 may act as a receiver for incoming light. When not in use, cover 119 may be removably attached around the base of first framework portion 110, such as by screws, fasteners, integrated threading or other mechanical attachment, to protect the lens assembly. Cover 119 may be formed of a high-durability plastic, metal, or other appropriate material.

Figure 2B:
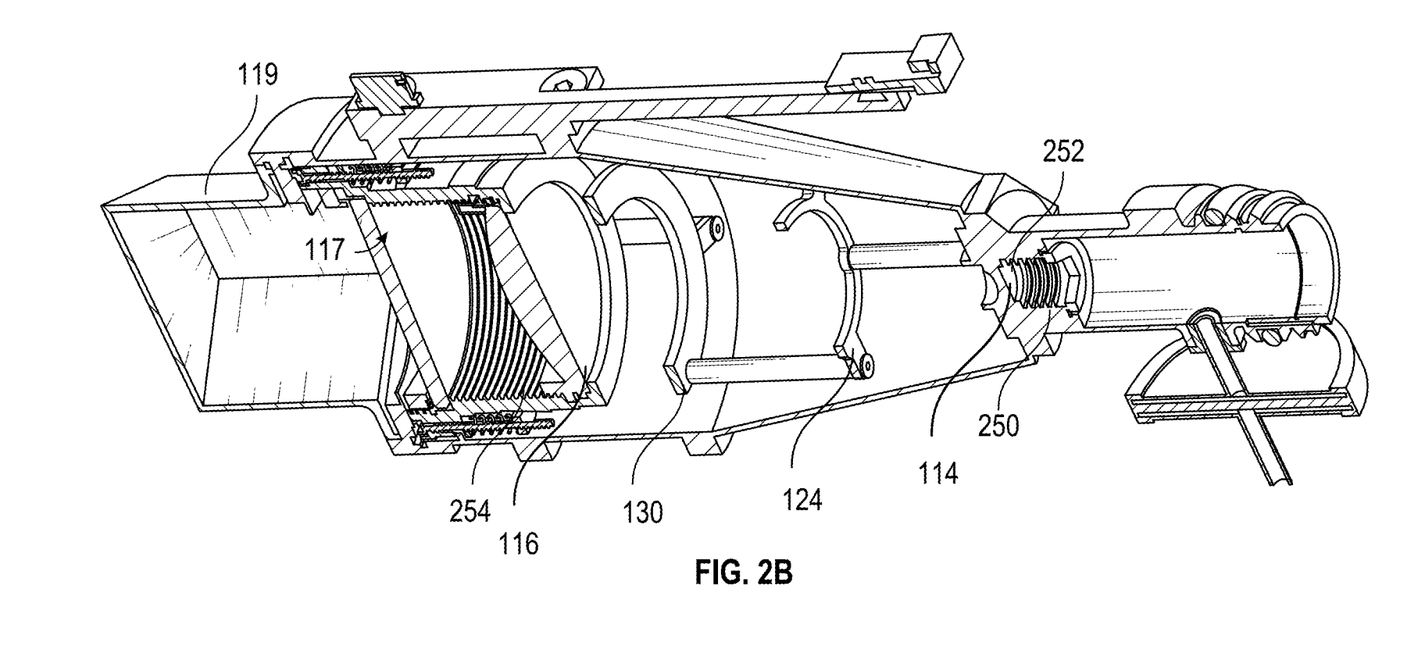
FIG. 2B depicts a cross-sectional view of an embodiment of the invention.

FIG. 2B depicts another cross-sectional view of the first embodiment of the invention. In some embodiments, one end of tier 122 of first framework portion 110 comprises a cylinder 248 having a wall 250 with an outer surface and an inner surface 252. In some embodiments, the inner surface 252 may contain grooves or ridges that may be operable to support and/or affix first lens 114. In some embodiments, grooves or ridges along the inner surface 252 may act as baffles to ensure that reflected light (such as from first lens 114) does not return and cause damage to fiber tip 132. In some embodiments, the cylinder 248, may comprise aluminum, which may connect to rods 128 of first tier comprising a second material, as discussed herein. In some embodiments, inner surface 252 may be smooth. Similarly, second framework portion 112 is depicted as containing grooves or ridges on an inner surface 254 that may be operable to support and/or affix second lens 116, while in some embodiments, the inner surface of the second framework portion 112 may be smooth. The first framework portion 110 comprises the set of tiered rods arranged around rings stepping up in size from the small spacing circumference about the first lens 114 up to a larger spacing circumference arrangement at a connection with the second framework portion 112 which surrounds second lens 116. Because the rods 128 of the first framework portion 110 are formed of a material having a much lower coefficient of thermal expansion than the coefficient of thermal expansion of the material forming the second framework portion 112, the first framework 110 portion is much longer than the second framework portion 112. As illustrated in FIG. 2B, the second framework portion 112 may comprise molded polyoxymethylene surrounding second lens 116, while the rods of first framework portion 110 may comprise a material with a very low coefficient of thermal expansion, such as Invar®.

Figure 3:
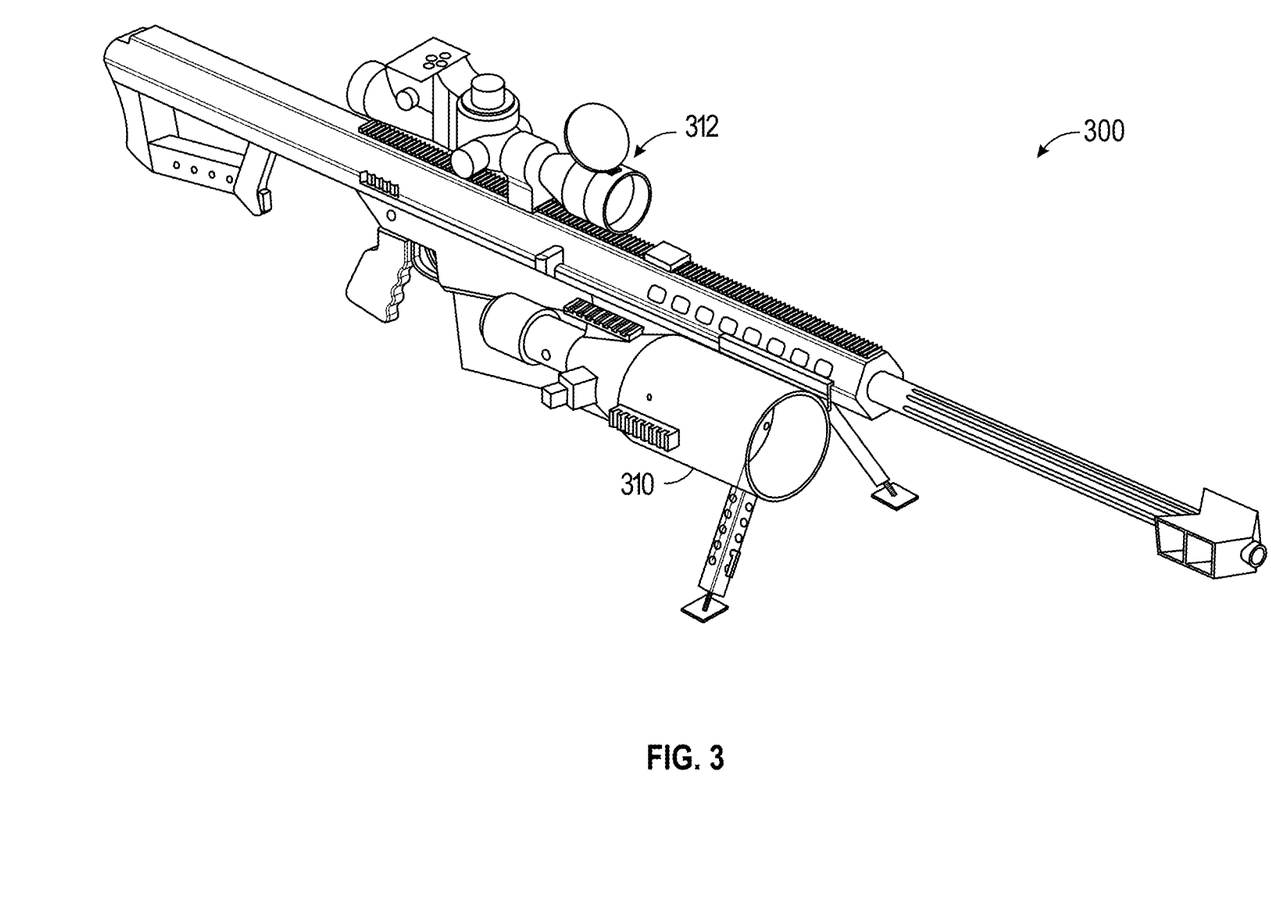
FIG. 3 depicts an embodiment of the invention coupled to a firearm.

As illustrated in FIG. 3, embodiments of the invention may be used to align and support lenses, windows, and/or other optical elements for an athermal optical output of a weaponized laser beam. A lens alignment system comprises an optical framework 100, such as shown in FIGS. 1-2, surrounded by a protective shell 310, which may be made of a metal, ceramic, or highly durable plastic, in some embodiments. The overall optical output element 100 is illustrated as being mounted to a firearm 300, though embodiments may alternatively be permanently or removably mounted to a building, ground, air, or water vehicle, gimble, actuator, worn apparatus, autonomous or semi-autonomous vehicle, or may be unmounted. In some embodiments, a targeting optical element 312 may be additionally provided. A targeting optical element 312 may be affixed directly to the optical output element 100, in some embodiments, to assist in directing an emitted laser. In other embodiments, a targeting optical element 312 may be provided uncoupled to optical output element 100.

Figure 4:
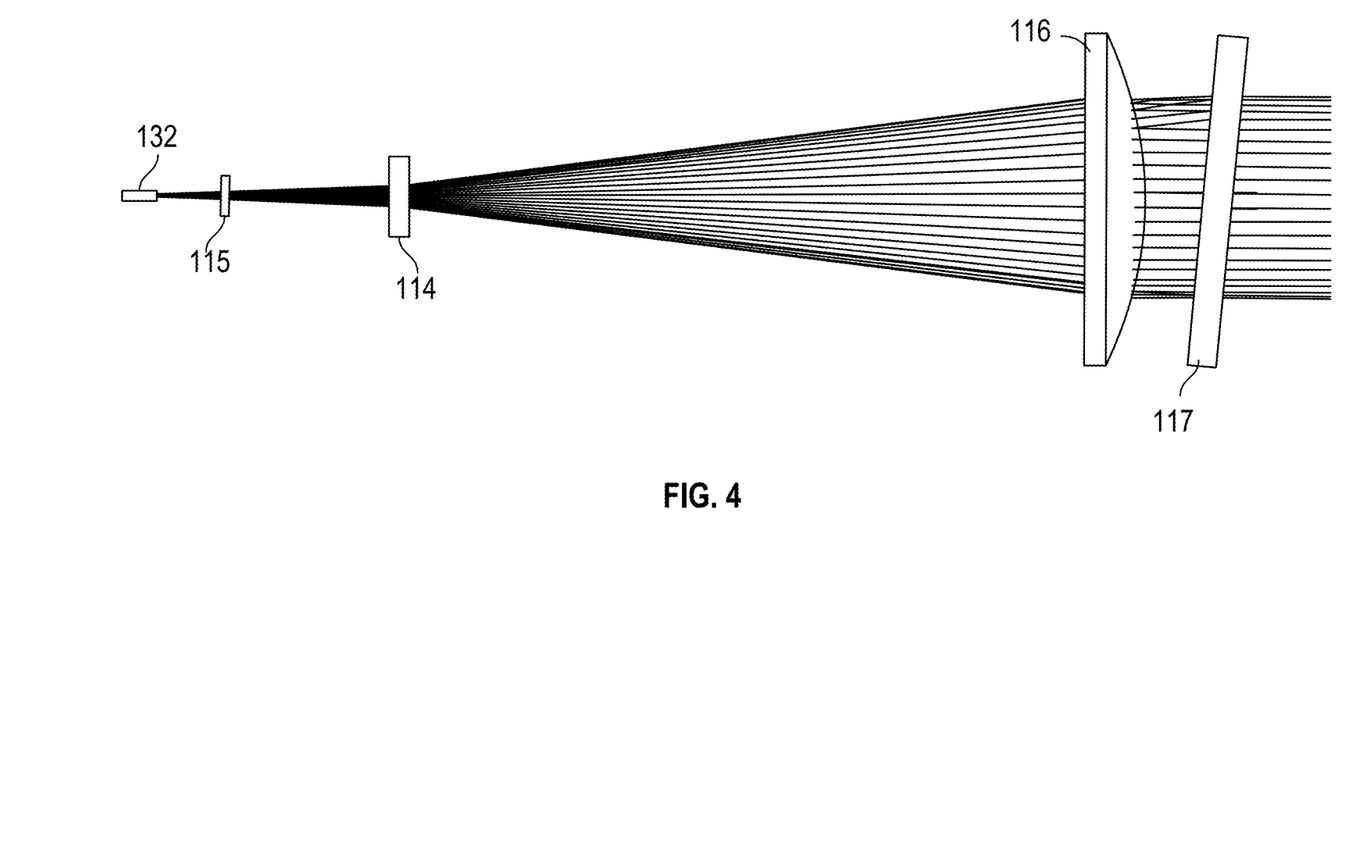
FIG. 4 depicts a conceptual diagram of an optical framework of the invention coupled to a laser beam generator.

As illustrated in FIG. 4, a laser beam may be configured to couple, in some embodiments of the invention, via a fiber connector 134 to the optical framework 100, which serves to refocus and direct the laser through a laser connection window 115 toward an intended target via a first lens 114 and second lens 116. In some embodiments, the fiber connector 134 may comprise titanium. In some embodiments, the fiber connector 134 may be attached to first framework portion 110. In some embodiments, the attachment may be by a threaded connection and/or any other appropriate connection, including epoxy. First framework portion 110 is coupled to second framework portion 112. In some embodiments, the coupling of the first framework portion 110 to second framework portion 112 may be via bolts and/or any other appropriate manner, including epoxy. In some embodiments, the bolts may comprise stainless steel or another metal. In some embodiments, the bolts may be threaded. In other embodiments, the bolts may be unthreaded.

Figure 5:
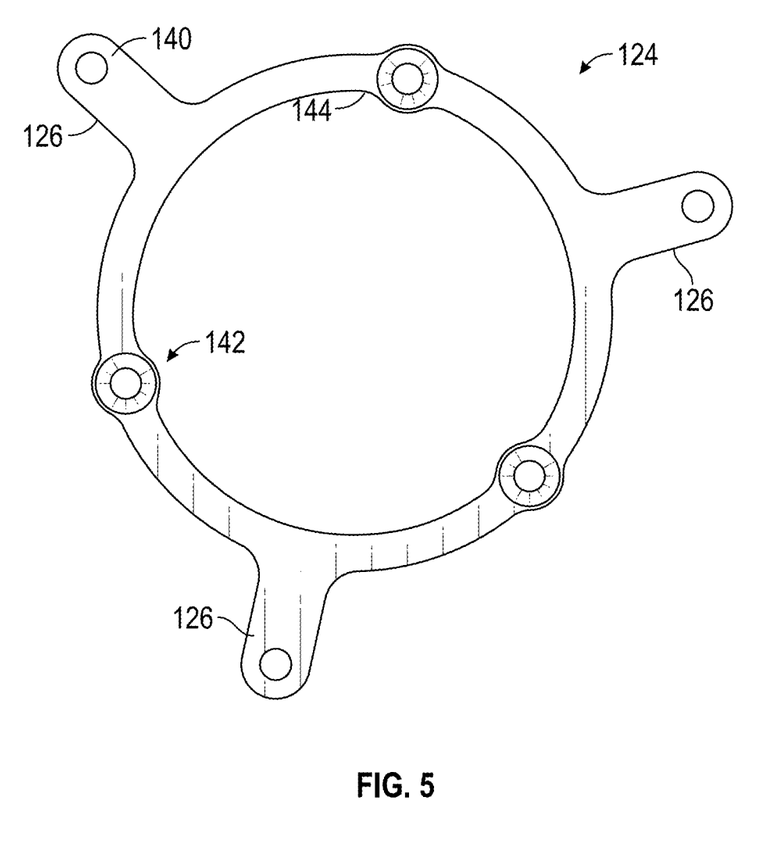
FIG. 5 depicts an embodiment of a ring for coupling tiers of an optical framework portion in an embodiment of the invention.

Turning to FIG. 5, in some embodiments, one or more rings 124 may have flanges 126 for coupling consecutive tiers. In some embodiments, rings 124 may have three flanges 126, as illustrated, each having a bolt hole 140 through which bolts may be received to couple rods 128 and consecutive tiers. Embodiments may have any number of flanges, including zero, and may be additionally or alternatively coupled by other methods including epoxy or welding. In some embodiments, bolts and/or rods comprise stainless steel, a nickel-iron alloy, other metals, or any other appropriate material or combinations thereof. Additionally or alternatively, secondary bolt holes 142 may be located on the inner body 144 of the ring 124. In some embodiments, one or more bolt holes 142 and/or bolt holes 140 may be reinforced by additional or alternative material about its circumference.

In particular embodiments, one or more rings may be provided to act as a light baffle to reduce unwanted stray light in a region about the ring 130. In addition, ring 130 may be configured to act as a baffle. An example of ring 130 is illustrated in FIG. 1. Ring 130 may have a width of the inner body 144 that is greater than that of ring 124. In some embodiments, in which the optical output element 100 is coupled to a laser beam generator, ring 130 may be used as a baffle to reduce the likelihood that stray photons are reflected back into the laser beam generator fiber tip 132, which may cause damage. In some embodiments, optical output element 100 may have multiple rings 130, which may act as baffles or none at all.

In some embodiments, one or more tiers in the first framework portion 110 may be formed of a plurality of rods 128. In specific embodiments, one or more tiers may comprise three rods 128 disposed evenly around the circumference of ring 124 to which they are affixed. Embodiments may have any number of rods 128 that may be evenly spaced from one another about the circumference of the ring 124 and/or ring 130. In some embodiments, the rods 128 may be unevenly spaced around the circumference of the ring 124 and/or ring 130. In some embodiments, rods 128 of one tier may be offset from the rods 128 forming one or more consecutive tiers such that they do not align with one another in order to increase the overall strength of the optical framework. Rods 128 of consecutive tiers may be displaced at distinct points about the circumference of their respective rings so that they do not align at the radial points about a circle at which they affix to one or more rings 124 of the optical framework. In particular embodiments, no rod 128 may align with any other rod, while in other embodiments, all or some rods 128 may align.

As illustrated in an exaggerated manner in FIG. 2, second framework portion 112 extends back from the distal end of first framework portion 110 towards first lens 114, supporting second lens 116 at a selected focal distance from first lens 114. In an embodiment, the distance between the lenses may be on the order of 100 mm. In some embodiments, the distance is about 100 mm to about 150 mm. In some embodiments, the distance may be about 138 mm. The thermal expansion of the first framework portion 110 during operation will cause the first and second lenses 114, 116 to move farther apart, while thermal expansion of the second framework portion 112 will cause the first and second lenses 114, 116 to move closer together. For appropriately selected materials relative to the respective lengths of the first and second framework portions 110, 112, the result will be a zero net displacement for the first and second lens 114, 116 over any temperature range. The first framework portion 110 and second framework portion 112 are arranged such that thermal expansion of the first framework portion 110 is equal and opposite to thermal expansion of the second framework portion 112. Thus, the first framework portion 110 and said second framework portion 112 are arranged such that thermal expansion of the first framework portion 110 in a first direction is offset by thermal expansion of the second framework portion 112 in the opposite direction.

FIG. 2A illustrates the second framework portion 112 situated fully inside of the largest tier 118 of the first framework portion 110, though in some embodiments it may extend longitudinally within multiple tiers. In some embodiments, at least a portion of the second framework portion 112 is fully surrounded in two dimensions by the first framework portion 110. In some embodiments, a distal portion of second framework portion 112 may protrude from the distal end of first framework portion 110. As the first framework portion 110 expands due to thermal expansion in the positive x-direction as indicated by the illustrated coordinate system of FIG. 2A, the second framework portion 112 expands due to thermal expansion in the negative x-direction, maintaining the alignment of the optical elements 114, 116 through any temperature gradient.

Specifically, in some embodiments, the result of this specifically designed configuration of optical framework elements is that the ratio of the length of the first framework portion 110 to the length of the second framework portion 112 is inversely proportional to the ratio of the coefficient of thermal expansion of the first framework portion 110 to the coefficient of thermal expansion of the second framework portion 112. In some embodiments, the proportionality may be unity, such that the ratio of the coefficient of thermal expansion of the first framework portion 110 to the coefficient of thermal expansion of the second framework portion 112 is equal to the inverse of ratio of the length of the first framework portion 110 to the length of the second framework portion 112.

Materials may be intentionally selected for the first and second framework portions 110, 112 to maintain these desired mathematical relationships. In some embodiments, the length of the first framework portion 110 is substantially longer than the length of the second framework portion 112, such that the first material comprising the first framework portion 110 must have a coefficient of thermal expansion that is lower than the coefficient of thermal expansion of the second material forming the second framework portion 112. In some embodiments, this may be a significant difference, wherein the coefficient of thermal expansion of the second material of the second framework portion 112 is at least 100 times the coefficient of thermal expansion of the first material of the first framework portion 110.

In an exemplary embodiment, the material of the first framework portion 110 comprises a nickel-iron alloy and the material of the second framework portion 112 comprises polyoxymethylene. The nickel-iron alloy in some embodiments may comprise the alloy commonly known as Invar®, Ni36. The material of the first framework portion 110 has a very low coefficient of thermal expansion. The material of the second framework portion 112, in some embodiments, may comprise Delrin®, acetal homopolymer (polyoxymethylene POM). The second material of the second framework portion 112 has a much higher coefficient of thermal expansion than the first material of the first framework portion 110, resulting in the net zero thermal displacement described above. For example, in some embodiments, the length of the first framework portion 110 is much longer than the length of the second framework portion 112. In some embodiments, the third framework portion, which forms the rings 124, 130 connecting the tiers of the first framework portion may be formed of a third material. In some embodiments, the third material comprises aluminum or an aluminum alloy. These exemplary materials are intended only as specific examples and the invention is not limited thereto. Any appropriate materials may be utilized in some embodiments of the invention. For example, in some embodiments one or more of the first, second, or third portion of the optical framework may comprise titanium, stainless steel, fused silica, ceramics, sapphire, or other materials resistant to high temperature environments. Additional materials utilized may include alloys or combinations of any of the materials discussed and/or other materials.

In some embodiments, materials of the particular framework portions may be selected such that the coefficient of thermal expansion of the material of the second framework portion 112 and the coefficient of thermal expansion of the material of the third framework portion are each at least four times the coefficient of thermal expansion of the material of first framework portion 110. In specific embodiments, the coefficient of thermal expansion of the first material of the first framework portion 110 may specifically be in a range from about $0.5 \times 10^{-6}$ m/m/K to about $2 \times 10^{-6}$ m/m/K. In some embodiments, the coefficient of thermal expansion of the second material of the second framework portion 112 may specifically be in a range from about $100\text{-}115 \times 10^{-6}$ m/m/K. In some embodiments, the coefficient of thermal expansion of the third material of a third framework portion including the rings 124, 130 coupling tiers of the first framework portion 110 may specifically be in a range from about $20\text{-}25 \times 10^{-6}$ m/m/K. In a specific embodiment, the first framework portion comprises Invar®, which has a coefficient of thermal expansion of about $1.26 \times 10^{-6}$ m/m/K, the second framework portion comprises Delrin®, which has a coefficient of thermal expansion of about $110.0 \times 10^{-6}$ m/m/K, and the third framework portion comprises aluminum, which has a coefficient of thermal expansion of about $23.6 \times 10^{-6}$ m/m/K at an operating temperature.

As will be understood by persons of skill, coefficients of thermal expansion often display a temperature dependence. A coefficient of thermal expansion for a given material in this description is intended to be understood, then, as the average coefficient of thermal expansion for the material over an operational temperature range. The operational temperature range may vary widely for various applications of the invention. For example, in an application where an embodiment of the invention is being used as an athermal optical output for a high-energy laser weapon, the optical framework that is fabricated, assembled, and aligned at room temperature may experience temperatures of over 50° C. while the laser is being fired. However, in an application where an embodiment of the invention is being used as part of a space-based telescope assembly, the optical framework that is fabricated, assembled, and aligned at room temperature may experience temperatures of below −270° C. when outside of Earth's atmosphere. Embodiments of the invention may provide optical frameworks that are configured to provide optical alignment of a plurality of lenses over either of these temperature gradients, using lengths of respective framework portions that are calculated using the average coefficient of thermal expansion over the respective application's entire operating range. As a specific example, in an application in which the ambient temperature may vary from about −20° C. to about 60° C., the coefficient of thermal expansion for a given material should be understood to be the average coefficient of thermal expansion for that material over the range of about −20° C. to about 60° C.

As discussed above, embodiments of the invention may be configured to permanently or detachably couple to a laser beam generator. In some embodiments, the optical framework may be surrounded by an encasing protective shell and/or may be configured to include additional elements such as iron sights or controls for adjusting the focus of the lenses. Embodiments of the invention may be configured to interface with a quick release attachment system, such as a picatinny rail mounting system. Embodiments may be configured to couple to one or more actuators for automatic target acquisition, which may be performed under the control of a processor and/or user controls. Additionally, or alternatively, actuators may further help compensate for thermal displacement, which may be done in response to the output of a temperature sensor. Additionally, or alternatively, embodiments may be configured to couple to one or more tripods or gimbles, or to a vehicle, which may be at least semi-autonomous. Embodiments may comprise any number of any type of optical elements not expressly illustrated or described including but not limited to lenses, mirrors, windows, and/or beam splitters. Embodiments may be configured to couple to one or more cameras.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed, and substitutions made herein without departing from the scope of the invention as recited in the claims. For example, though an optical framework 100 is described primarily with regards to a laser beam optical output, embodiments may be equivalently applicable to telescope, microscope, seeker for a guided missile, or any other optical applications. Any implementation that seeks to maintain optical alignment throughout a temperature range is intended for inclusion within embodiments of the invention.

Having thus described various embodiments of the invention, what is claimed as new and desired to be protected by Letters Patent includes the following:

1. An optical assembly comprising:
   a first lens and a second lens,
   wherein the first lens and the second lens are aligned via a framework;
   said framework comprising a first framework portion, a second framework portion, and a third framework portion;
   said first framework portion comprising a first material having a first coefficient of thermal expansion;
   said second framework portion comprising a second material having a second coefficient of thermal expansion,
   said third framework portion comprising a third material distinct from the first material and the second material and having a third coefficient of thermal expansion,
   wherein the second coefficient of thermal expansion and the third coefficient of thermal expansion are greater than the first coefficient of thermal expansion, wherein said first framework portion and said second framework portion are arranged such that a first thermal expansion of the first framework portion in a first direction is offset by a second thermal expansion of the second framework portion in a second direction opposite from the first direction.

2. The optical assembly of claim 1,
wherein said first framework portion is coupled to the first lens, and
wherein said second framework portion is coupled to the second lens.

3. The optical assembly of claim 2, wherein a plurality of discontinuous sections forming said first framework portion are adjoined by one or more rings.

4. The optical assembly of claim 1,
wherein the first material comprises a nickel-iron alloy, and
wherein the second material comprises polyoxymethylene.

5. The optical assembly of claim 1, wherein the third material comprises aluminum or an aluminum alloy.

6. The optical assembly of claim 1, wherein at an operational temperature, the first framework portion has a first relaxed length, and the second framework portion has a second relaxed length,
wherein a first ratio of the first relaxed length to the second relaxed length is inversely proportional to a second ratio of the first coefficient of thermal expansion to the second coefficient of thermal expansion.

7. The optical assembly of claim 1, wherein the third framework portion comprises a plurality of rings joining tiers of the first framework portion.

8. An optical assembly comprising:
a first lens and a second lens supported by a framework;
said framework comprising a first framework portion and a second framework portion;
wherein said first framework portion comprises a plurality of concentric tiers, each concentric tier comprising a plurality of longitudinal rods,
wherein the plurality of longitudinal rods of a first concentric tier of the first framework portion comprises at least three rods and is offset from the plurality of longitudinal rods of an adjacent tier,
wherein the plurality of concentric tiers is coupled together by one or more rings,
wherein said first framework portion comprises a first material having a first coefficient of thermal expansion,
wherein said second framework portion comprises a second material having a second coefficient of thermal expansion,
wherein said first framework portion and said second framework portion are arranged such that thermal expansion of the first framework portion in a first direction is offset by thermal expansion of the second framework portion in an opposite direction,
wherein the second lens is housed within a concentric tier of said first framework portion.

9. The optical assembly of claim 8,
wherein the one or more rings comprise a third material,
wherein the third material is distinct from the first material and the second material.

10. The optical assembly of claim 8, wherein the optical assembly is configured to be coupled to a laser beam generator.

11. The optical assembly of claim 8,
wherein the first framework portion has a first length,
wherein the second framework portion has a second length, and
wherein a first ratio of the first length to the second length is equal to an inverse of a second ratio of the first coefficient of thermal expansion to the second coefficient of thermal expansion.

12. The optical assembly of claim 8, wherein a first ring of the one or more rings has a first inner width greater than a second inner width of a second ring of the one or more rings.

13. The optical assembly of claim 8, wherein the second framework portion is disposed within the first framework portion.

14. A lens alignment system comprising:
a framework;
a first lens coupled to a first portion of the framework;
a second lens coupled to a second portion of the framework;
wherein the first lens and the second lens are separated by a first distance,
wherein said first portion comprises a plurality of tiers and a first material having a first coefficient of thermal expansion,
wherein each tier of the plurality of tiers has a distinct outer circumference,
wherein a tier of the plurality of tiers nearest to the second portion has a largest circumference of the plurality of tiers,
wherein said second portion is formed of a second material having a second coefficient of thermal expansion that is greater than the first coefficient of thermal expansion,
wherein a first length of the first portion is greater than a second length of the second portion, and
wherein said first portion and said second portion are arranged such that the first distance remains constant throughout an operating temperature range of the lens alignment system.

15. The lens alignment system of claim 14, wherein the second coefficient of thermal expansion is at least 100 times the first coefficient of thermal expansion.

16. The lens alignment system of claim 14, wherein the second portion is at least partially surrounded in two dimensions by the first portion.

17. The lens alignment system of claim 14, wherein adjacent tiers of the plurality of tiers are coupled together via flanged rings formed of a third material, said third material being distinct from the first material and the second material.

18. The lens alignment system of claim 14, wherein a tier of the first portion coupled to the first lens has a smallest circumference of any of the plurality of tiers of the first portion.

19. The lens alignment system of claim 14, further comprising a fiber connector for directing a laser towards an intended target via the first lens and the second lens.

20. The lens alignment system of claim 19, wherein the fiber connector is coupled to the first portion of the framework.

* * * * *